July 16, 1929.                W. MOHR                1,721,083
DOUGH DIVIDING AND WORKING MACHINE
Filed Sept. 8, 1925      2 Sheets-Sheet 1
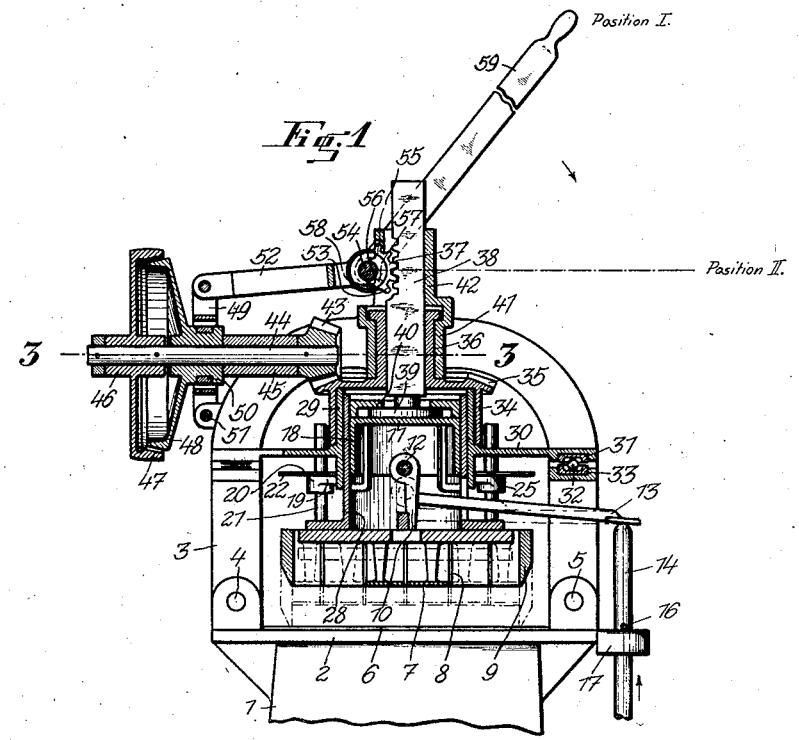
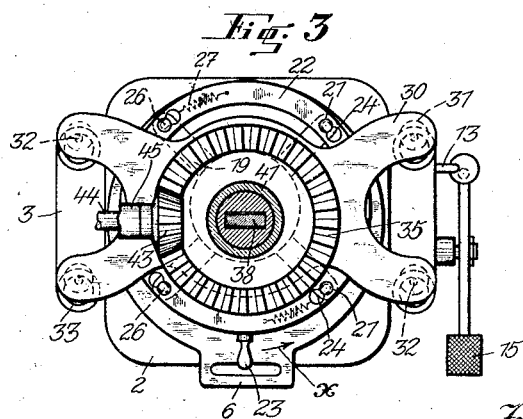
Inventor:
Wilhelm Mohr
by:
Lotka, Kehlenbeck & Farley
Attorneys.

July 16, 1929.  W. MOHR  1,721,083
DOUGH DIVIDING AND WORKING MACHINE
Filed Sept. 8, 1925  2 Sheets-Sheet 2
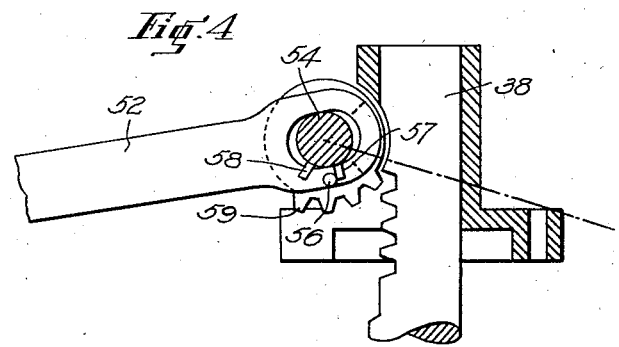
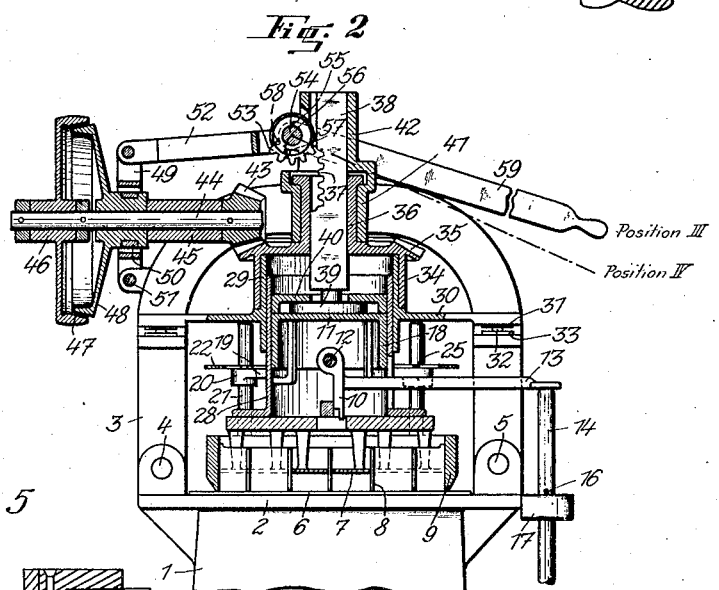
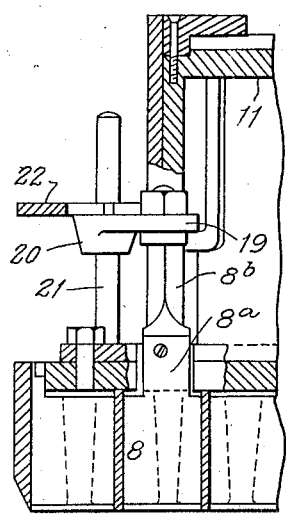
Inventor:
Wilhelm Mohr
by
Sooka, Kohlenbeck & Farley
Attorneys.

Patented July 16, 1929.

1,721,083

UNITED STATES PATENT OFFICE.

WILHELM MOHR, OF DOLAU BEZ. HALLE-ON-THE-SALLE, GERMANY.

DOUGH DIVIDING AND WORKING MACHINE.

Application filed September 8, 1925, Serial No. 54,859, and in Germany September 17, 1924.

My invention relates to improvements in dough dividing and working machines, and more particularly in machines of the type in which a batch of dough is pressed between two pressure members and separated into pieces by a cutting member, whereupon relative gyratory movement is imparted to the pressure members for working the pieces. The object of the improvements is to provide a machine of this class which is simple in construction and effective in operation, and which can be manufactured at low cost, and with this object in view my invention consists in imparting the said gyratory movement by means of a rotary driving member having its axis parallel to and eccentrical of the working member.

For the purpose of explaining the invention an example embodying the same has been shown in the accompanying drawings, in which the same reference characters have been used in all the views to indicate corresponding parts. In said drawings, Fig. 1, is a sectional elevation of the machine showing the pressing and cutting members in elevated positions, Fig. 2, is a similar elevation showing the said members in the position after cutting the batch of dough, Fig. 3, is a plan view in section taken on the line 3—3 of Fig. 1;

Fig. 4 is an enlarged sectional detail showing the connection between the clutch shifting arm and the shaft upon which the manually operable lever is secured; and Fig. 5 is an enlarged sectional detail showing the manner in which the knives are fastened to the knife holder.

In the example shown in the drawings my improved machine comprises a suitable support 1 carrying a table 2 and a top part in the form of a bail 3 secured to the table 2 by means of bolts 4, 5. The table 2 is adapted to support a dough carrying plate 6. Above the table there is a pressure plate 7 provided with a cutting knife 8 and a ring 9 enclosing the same. The pressure plate 7 and the knife 8 are adapted to be fixed in position relatively to each other by means of a lever 10 rockingly mounted on a bolt 12 secured to the knife holder 11 and provided with an arm 13 extending laterally therefrom and to the outside of the machine. The said arm bears with its outer end on a rod 14 guided in a pair of apertured bosses such as 17 one made integral with the table 2 and the other (not shown) being made integral with the support 1 thereof. The rod 14 is adapted to be lifted by means of a foot lever 15, and it is normally held in its lower-most position by gravity a stop pin 16 being secured in said rod for engagement with the top face of the eye 17 to limit the downward movement of said rod.

The knife 8 is connected with the knife holder 11 in any known way. The means for securing the knife to the knife holder are well known and common in this art. In accordance with the common practice, one of the blades of the knife 8 is provided with an upward extension $8^a$ secured to a bolt $8^b$ depending from the knife holder. In the particular constructional example herein disclosed, the bolt $8^b$ two of which are provided are secured to the arms 19. The knife holder comprises a sleeve 18 provided with four arms 19 made integral at their ends with apertured bosses 20 guided on vertical rods 21 fixed to the ring 9. The arms 19 provide a support for a ring 22 adapted to be turned in the direction of the arrow $x$ shown in Fig. 3 by means of a handle 23. The rods 21 are formed with recessed portions 25 corresponding to the elongated portions 26 of keyhole slots formed in the ring 22, the circular portions 24 of said slots having a diameter which is slightly larger than that of the rods 21. Normally the elongated portions 26 engage the recessed portions of the rods 21, but when the ring 22 is turned in the direction of the arrow $x$ the circular portions 24 are brought into alignment with the rods 21, so that the ring 22 and the rods 21 can be shifted relatively to each other in axial direction. Springs 27 secured respectively to the ring 22 and a relatively fixed part of the machine tend to turn the ring in a direction opposite to the arrow $x$ to hold the elongated portions 26 normally in engagement with the recessed portions 25.

The sleeve 18 is axially shiftable within a sleeve 28 connected with the pressure plate 7, and the said sleeve is enclosed within a sleeve 29 made integral with four arms 30 having bearing plates 31 embedded in recesses made in the bottom faces thereof. The said bearing plates 31 are located above bearing plates 33 supported on the bail 3, and a ball 32 is interposed between each of the pairs of plates 31 and 33, which balls have sufficient play to permit the gyratory movement to be described hereinafter. The sleeves 28 and 29 are provided with slots permitting the passage of the arms 19 to the knife holder therethrough.

The sleeve 29 is surrounded by a flange 34 depending from a beveled gear wheel 35 and disposed eccentrically thereof, the hub 36 of the said gear wheel being rotatably mounted in a sleeve 41 made integral with the bail 3 and formed at its top with a tubular extension 42. Within the hub 36 and the tubular extension 42 a rod 38 is vertically shiftable, which rod is formed with rack teeth 37 and carries a flange 39 disposed between the top part of the knife holder 11 and a disk 40. The beveled gear wheel 35 is in mesh with a beveled gear wheel 43 keyed to a shaft 44 mounted in a bearing sleeve 45 secured to or made integral with the bail 3. On the said shaft a pulley 46 is loosely mounted the rim 47 of which is in the form of a clutch member cooperating with a clutch member 48 keyed to and longitudinally shiftable on the shaft 44. The hub of the said clutch member 48 is formed with a circumferential groove engaged by a ring 50 connected with an arm 49 rockingly mounted at 51 and adapted to be rocked axially of the shaft 44 by means of an arm 52 jointed to the top end thereof. The arm 52 is bifurcated at its free end and the bifurcated end thereof straddles a toothed segment 53 keyed to a bolt 54 rockingly mounted in eyes 55 provided on the tubular extension 42 of the sleeve 41 and the bail 3, the said segment meshing with the rack teeth 37. The bifurcated portion of the arm 52 is provided with a laterally projecting lug or pin 56 adapted to be engaged on one side by a pin 57 fixed to the bolt 54 and at its opposite side by a pin 58 fixed to the bolt 54. The toothed segment 53 is secured to the bolt 54, and the said bolt is adapted to be rocked by means of a hand lever 59 secured thereto.

In the operation of the machine a batch of dough carried by the plate 6 is placed on the table 2 of the machine and the ring 22 is turned by means of the handle 23 in the direction of the arrow $x$ and in opposition to the springs 27, thus bringing the elongated portions 26 of the keyhole slots out of engagement with the recessed portions 25 of the rods 21 and bringing the circular portions 26 of said slots into alignment with the rods and thereby permitting the ring 9 to drop on the plate 6 by gravity. Now the lever 59 is rocked from the position I shown in Fig. 1 into the position II, so that the rod 38 and the parts carried thereby and more particularly the pressure plate 7, are forced downwardly, and the batch of dough is pressed. Thereafter the arm 10, 13 is rocked by means of the foot lever 15 and through the intermediary of the rod 14, so that the pressure plate 7 and the knife 8 are disconnected, whereupon the lever 59 can be rocked from the position II into the position III shown in Fig. 2, and the knife 8 cuts the batch of dough. When the knife 8 makes contact with the plate 6 the ring 22 is in alignment with the recessed portions 25 of the rod 21 so that the ring 22 is turned by the springs 27 in a direction opposite to the arrow $x$ to cause the elongated portions 26 of the keyhole slots to be brought into engagement with the recessed portions 25, whereby the knife 8 and the ring 9 are locked in their lowermost positions.

In the position III of the lever 59 the teeth of the segment 53 have disengaged the rack teeth 37 of the rod 38, as is shown in Fig. 2, and the pin 57 engages the lug 56 thus shifting the arm 52 to the left when further rocking the lever 59 downwardly and into the position IV. Thereby the clutch members 47 and 48 are thrown into coupling engagement and the shaft 44 is rotated, such rotary movement being transmitted by the bevel gearing 43, 35 to the eccentric flange 34. By reason of the eccentricity of the flange 34 gyratory movement is imparted to the head carrying the knife 8, the balls 32 permitting the relative movement of the plates 31 and 33.

From the foregoing description of the operation of the machine it will be understood that the operations of pressing, dividing and working of the dough follow one another in immediate succession, the said operations being controlled by means of a single hand lever 59.

After working the lever 59 is rapidly returned into the initial position I, so that the operation of the machine is interrupted.

For cleaning the machine the bolt 5 is removed, and the bail 3 and the parts carried thereby are rocked away from the table 2.

My improved machine is simple in construction and operation, and it has a high efficiency. An important feature resides in that the gyratory movement is imparted to the dividing and working apparatus by means of the flange 34 disposed eccentrically of its axis. Another important feature is that a single operating lever 59 is used for controlling the operation of the machine, the said lever having the functions, first, to move the pressing, cutting and working apparatus downwardly, and second, to operate the coupling members 47, 48. By thus controlling all the operations of the machine from a single lever a reliable operation is insured, the working operation beginning necessarily at the correct moment and immediately after completing the dividing of the batch of dough. This is important for the reason that when beginning working before the end of the dividing operation pieces of non-uniform size are produced, and when beginning working within a certain period of time after dividing the dough it is impossible to produce a smooth surface by working, as is necessary for preventing separation of the pieces during the following fermentation.

Another important feature of the invention resides in constructing the eccentric driving member in the form of a hollow cylinder 34 guiding the sleeve 29 bearing with its laterally projecting arms 30 on bearings carried by the machine frame, said sleeve enclosing the sleeve 28 connected with the pressure plate. Thereby the parts which are moved during the working operation are reliably guided, the rotary parts having large bearing surfaces. Further, the said rotary parts can be comparatively light.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a dough dividing and working machine, the combination, with a member adapted to support a batch of dough, and a dough dividing and working member, of a single operating device rotatably engaging one of said members, and means to rotate said operating device about an eccentric axis.

2. In a dough dividing and working machine, the combination, with a member adapted to support a batch of dough, and a dough dividing and working member, of an operating device rotatably embracing said dividing and working member, and driving means adapted to rotate said operating device about an eccentric axis.

3. In a dough dividing and working machine, the combination, with a member adapted to support a batch of dough, and a dough dividing and working member provided with a cylindrical portion, of a tubular member embracing said cylindrical portion and mounted for moving transversely of its axis, a cylinder rotatably surrounding said tubular member, and means to rotate said cylinder about an eccentric axis.

4. In a dough dividing and working machine, the combination, with a member adapted to support a batch of dough, and a dough dividing and working member provided with a cylindrical portion, of a tubular member embracing said cylindrical portion and formed with laterally projecting arms mounted for permitting movement of said tubular member transversely of its axis, a cylinder rotatably surrounding said tubular member, and means to rotate said cylinder about an eccentric axis.

5. In a dough dividing and working machine, the combination of a stationary supporting member adapted to support a batch of dough, a combined dough dividing and working member movable relatively to said supporting member, means for moving said dividing and working member toward said supporting member to divide the batch of dough, means for imparting a working movement to said dividing and working member to work said dough, a single operating lever, and connections from said lever to said moving means and to said imparting means respectively whereby an operation of said lever will operate said moving means and imparting means in succession.

In testimony whereof, I hereunto affix my signature.

WILHELM MOHR.